(12) United States Patent
Mullin et al.

(10) Patent No.: US 11,015,829 B2
(45) Date of Patent: May 25, 2021

(54) SYSTEM, MOTOR CONTROLLER AND ASSOCIATED METHOD

(71) Applicant: Regal Beloit America, Inc., Beloit, WI (US)

(72) Inventors: Paul Steven Mullin, Yellow Springs, OH (US); Michael David Smith, Rogers, AR (US); Katie Da-Nelle Hamilton, Covington, OH (US); Srinivas Chandu Kutcherlapati, Cassville, MO (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 16/097,537

(22) PCT Filed: Apr. 28, 2017

(86) PCT No.: PCT/US2017/030083
§ 371 (c)(1),
(2) Date: Oct. 29, 2018

(87) PCT Pub. No.: WO2017/189980
PCT Pub. Date: Nov. 2, 2017

(65) Prior Publication Data
US 2019/0145647 A1 May 16, 2019

Related U.S. Application Data

(63) Continuation of application No. 15/142,426, filed on Apr. 29, 2016, now Pat. No. 10,914,484.

(51) Int. Cl.
*F24F 11/46* (2018.01)
*H04B 3/54* (2006.01)
(Continued)

(52) U.S. Cl.
CPC ............. *F24F 11/46* (2018.01); *F24F 11/58* (2018.01); *F24F 11/64* (2018.01); *F24F 11/65* (2018.01);
(Continued)

(58) Field of Classification Search
CPC ............... C12Q 1/686; C12Q 2523/32; C12Q 2563/159; C12Q 2565/629; B60L 2200/26
See application file for complete search history.

(56) References Cited

U.S. PATENT DOCUMENTS

| | | | |
|---|---|---|---|
| 1,971,483 A | | 8/1934 | Espenschied |
| 4,367,557 A | * | 1/1983 | Stern ........................ H04K 3/41 725/149 |

(Continued)

*Primary Examiner* — Zoheb S Imtiaz
(74) *Attorney, Agent, or Firm* — Armstrong Teasdale LLP

(57) ABSTRACT

An electronic control module is provided. The electronic control module is operably connected to a power supply for providing power to a motor. The electronic control module includes an input device, a processor coupled to the input device, and first and second current supply lines. The processor is configured to generate a command signal in response to an input supplied by the input device and transmit the command signal to the motor. The command signal controls an operating point of the motor. The first and second current supply lines are operably connectable to the motor and the processor. At least one of the current supply lines, the input device and the processor are adapted to utilize the current supply lines both to transmit power to the motor and to transmit the command signal to the motor over the current supply lines.

20 Claims, 9 Drawing Sheets

(51) Int. Cl.

| | | |
|---|---|---|
| *H02P 5/74* | (2006.01) | |
| *H04W 4/80* | (2018.01) | |
| *F24F 11/64* | (2018.01) | |
| *F24F 11/88* | (2018.01) | |
| *F24F 11/65* | (2018.01) | |
| *F24F 11/58* | (2018.01) | |
| *G05B 19/042* | (2006.01) | |
| *H02P 23/00* | (2016.01) | |
| *F24F 11/77* | (2018.01) | |

(52) U.S. Cl.
CPC ............ *F24F 11/88* (2018.01); *G05B 19/042* (2013.01); *H02P 5/74* (2013.01); *H02P 23/0077* (2013.01); *H04B 3/548* (2013.01); *H04W 4/80* (2018.02); *F24F 11/77* (2018.01); *G05B 2219/2614* (2013.01)

(56) References Cited

U.S. PATENT DOCUMENTS

| | | | | |
|---|---|---|---|---|
| 4,639,714 | A * | 1/1987 | Crowe | H04B 3/548 340/12.33 |
| 5,242,404 | A * | 9/1993 | Conley | A61M 1/0031 604/119 |
| 5,821,725 | A * | 10/1998 | Wang | H02P 6/10 318/799 |
| 7,769,091 | B2 | 8/2010 | Tsuchida | |
| 8,593,266 | B2 | 11/2013 | Robertson et al. | |
| 8,810,091 | B2 | 8/2014 | Sato et al. | |
| 8,952,793 | B2 | 2/2015 | Nishihara | |
| 9,001,926 | B2 | 4/2015 | Shad | |
| 9,206,684 | B2 | 12/2015 | Parra et al. | |
| 9,325,377 | B2 | 4/2016 | Katar et al. | |
| 9,399,992 | B2 * | 7/2016 | Koehl | F04D 15/0236 |
| 2003/0146726 | A1 * | 8/2003 | Ishikawa | B60L 50/40 318/442 |
| 2003/0234624 | A1 * | 12/2003 | Frankel | H02P 6/08 318/268 |
| 2008/0180048 | A1 * | 7/2008 | Mullin | H02P 6/34 318/400.26 |
| 2010/0060224 | A1 * | 3/2010 | Chen | H02P 29/032 318/504 |
| 2010/0121507 | A1 | 5/2010 | Ishii et al. | |
| 2011/0018472 | A1 * | 1/2011 | Rockenfeller | H02P 5/74 318/51 |
| 2011/0068727 | A1 * | 3/2011 | Welchko | H02P 29/02 318/490 |
| 2011/0204832 | A1 * | 8/2011 | Zavodny | H02P 23/0004 318/400.3 |
| 2012/0217922 | A1 * | 8/2012 | Sato | G01R 31/42 318/490 |
| 2012/0244015 | A1 * | 9/2012 | Benson | F04D 25/166 417/53 |
| 2013/0063058 | A1 * | 3/2013 | Shouji | H02P 21/22 318/400.06 |
| 2013/0119902 | A1 * | 5/2013 | Gries | H02P 5/74 318/400.3 |
| 2014/0265985 | A1 * | 9/2014 | Bonner, Jr. | H02P 5/00 318/494 |
| 2014/0300301 | A1 * | 10/2014 | Ramsingh | H02K 11/33 318/400.09 |
| 2015/0048924 | A1 * | 2/2015 | Feldstein | G07C 9/27 340/5.51 |
| 2015/0091482 | A1 * | 4/2015 | Zhao | H02P 6/16 318/400.15 |
| 2015/0326162 | A1 * | 11/2015 | Yoo | H02P 21/141 318/801 |
| 2016/0028559 | A1 * | 1/2016 | Bernard | H04L 25/0264 318/16 |
| 2016/0061899 | A1 * | 3/2016 | Gauthier | G01R 31/343 701/34.4 |
| 2016/0067872 | A1 | 3/2016 | Binder | |
| 2017/0174488 | A1 * | 6/2017 | Sheeley | B66F 11/046 |

\* cited by examiner

SYSTEM, MOTOR CONTROLLER AND ASSOCIATED METHOD

CROSS REFERENCE TO RELATED APPLICATIONS

This application claims benefit of PCT Patent Application No. PCT/US2017/030083 filed Apr. 28, 2017, which claims priority to U.S. patent application Ser. No. 15/142,426 filed on 29 Apr. 2016, both of which are incorporated herein by reference in their entirety.

BACKGROUND OF THE INVENTION

The embodiments described herein relate generally to an electric machine, and more specifically, to an electric motor.

An electric machine is typically in the form of an electric generator or an electric motor. The machine typically has a centrally located shaft that rotates relative to the machine. Electrical energy applied to coils within the machine initiates the relative motion that transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to a rotor and then to a shaft. These coils are formed by winding wire, typically copper, aluminum or a combination thereof, about a central core to form the winding or coil. An electric current is directed through the coils, which induces a magnetic field. It is the magnetic field that initiates this relative motion that transfers the power to the shaft.

Electric motors are utilized in many varied application and are energized utilizing a user interface. The motors may be positioned in locations not easily accessible to the user. Such applications include ceiling fans, HVAC applications and refrigeration applications. In order to provide convenient access to the user interface, such applications have a user interface spaced a significant distance from the motor.

To provide improved performance and energy savings multiple speed motors are frequently used. The user interface for such motors provides for a command signal to be sent to the motor that include information in addition to a simple on and off. Such signals include the proper operating speed of the multiple speed motor. The wiring harnesses needed to transmit the command signal from the user interface to the motor are expensive to manufacture and inconvenient to install, particularly in existing structures.

The present invention is directed to alleviate at least some of these problems with the prior art.

BRIEF DESCRIPTION OF THE INVENTION

The method, systems and apparatus described herein facilitate the transmission of a command signals from a control module to an electric machine and of responses from the electric machine to the control module.

The electric machine typically includes a housing for containing and supporting a stator that is excited by an electrical source that excites an electromagnetic field in coils in the stator. The coils interact with a rotor rotatably supported in the housing to provide the mechanical rotational energy for the electrical machine.

Electric machines or motors are utilized in many varied application and are energized utilizing a user interface. The motors may be positioned in locations not easily accessible to the user. Such applications include ceiling fans, HVAC applications and refrigeration applications. In order to provide convenient access to the user interface, such applications have a user interface spaced a significant distance from the motor.

To provide improved performance and energy savings multiple speed motors are frequently used. The user interface for such motors provides for a command signal to be sent to the motor that include information in addition to a simple on and off. Such signals include the proper operating speed of the multiple speed motor. The wiring harnesses needed to transmit the command signal from the user interface to the motor are expensive to manufacture and inconvenient to install, particularly in existing structures.

According to an embodiment of the invention, an electronic control module is provided. The electronic control module is operably connected to a power supply for providing power to a motor. The electronic control module includes an input device, a processor coupled to the input device, and first and second current supply lines. The processor is configured to generate a command signal in response to an input supplied by the input device and transmit the command signal to the motor. The command signal controls an operating point of the motor. The first and second current supply lines are operably connectable to the motor and the processor. At least one of the current supply lines, the input device and the processor are adapted to utilize the current supply lines both to transmit power to the motor and to transmit the command signal to the motor over the current supply lines.

According to an aspect of the present invention, the electronic control module may be provided wherein the processor is configured to transmit the command signal to a plurality of motors. The command signal controls an operating point of each of the plurality of motors.

According to an aspect of the present invention, the electronic control module may be provided wherein one of the motors includes a power supply and may communicate with other motors on a distribution bus formed by the supply lines.

According to an aspect of the present invention, the electronic control module may be provided wherein the processor is located in the power supply or the motor.

According to an aspect of the present invention, the electronic control module may be provided wherein the processor is adapted to be programmed utilizing near field communications.

According to an aspect of the present invention, the electronic control module may be provided wherein the command signal operates at, for example, a frequency of one kilo hertz to one megahertz.

According to another embodiment of the invention, a motor control system is provided. The system includes a motor; an input device; a processor, a current power supply; and first and second current supply lines.

According to yet another aspect of the present invention, the system may be provided wherein the input device includes a user interface.

According to yet another aspect of the present invention, the system may be provided wherein the user interface includes a push button switch.

According to yet another aspect of the present invention, the system may be provided wherein the user interface includes a toggle switch.

According to yet another aspect of the present invention, the system may be provided wherein the user interface includes a selector switch.

According to yet another aspect of the present invention, the system may be provided wherein the selector switch is adapted to select the size of the room for which the system is used.

According to yet another aspect of the present invention, the system may be provided wherein the selector switch is adapted to select the number of air changes per day for the room for which the system is used.

The processor is coupled to the input device. The processor is configured to generate a command signal in response to an input supplied by the input device and to transmit the command signal to the motor. The command signal controls an operating point of the motor. The processor is operably connected to the motor.

The first and second current supply lines are operably connectable to the motor and to the processor. At least one of the current supply lines, the input device and the processor are adapted to utilize the current supply lines both to transmit power to the motor and to transmit the command signal to the motor over the current supply lines.

According to another aspect of the present invention, the system may be provided wherein the operating point may include the speed of the motor.

According to another aspect of the present invention, the system may be provided wherein the operating point may include the torque applied by the motor.

According to another aspect of the present invention, the system may be provided wherein the operating point may include the current drawn by the motor.

According to an aspect of the present invention, the system may further include a fan box. The power supply and/or the motor may be located in the fan box.

According to another aspect of the present invention, the system may further include a sensor.

According to another aspect of the present invention, the system may be provided wherein the system is adapted to send a sensor signal generated by the sensor to said processor.

According to another aspect of the present invention, the system may be provided wherein the system is adapted to adjust the operating point in response to the sensor signal generated by the sensor.

According to another aspect of the present invention, the system may be provided wherein the light sensor is adapted to determine when the room is in use.

According to another aspect of the present invention, the system may further include a timer.

According to another aspect of the present invention, the system may be provided wherein timer cooperates with the processor to limit runtime of the motor.

According to another aspect of the present invention, the system may be provided wherein timer cooperates with the processor to limit energy use of the motor.

According to another aspect of the present invention, the system may be provided wherein timer cooperates with the processor to operate the motor to provide for a minimum number of daily air changes.

According to another aspect of the present invention, the system may be provided wherein the sensor is an occupancy sensor.

According to another aspect of the present invention, the system may be provided wherein the occupancy sensor includes a motion detector.

According to another aspect of the present invention, the system may be provided wherein the motion detector includes a IR device.

According to another aspect of the present invention, the system may be provided wherein the processor is adapted to adjust the operating speed of the motor when the occupancy sensor detects that the room is occupied.

According to another aspect of the present invention, the system may be provided wherein the processor is adapted to keep the motor running after the occupant leaves the room.

According to another aspect of the present invention, the system may be provided wherein the processor is adapted to change the speed of the motor after the occupant leaves the room. According to another aspect of the present invention, the system may be provided wherein the processor is adapted to communicate with a near field communication device to configure the power supply.

According to another aspect of the present invention, the input device may include a light switch. The power supply may be located adjacent the light switch.

According to yet another aspect of the present invention, the system may be provided wherein the current power supply is a direct current supply.

According to yet another aspect of the present invention, the system may be provided wherein the current power supply is a 24 Volt direct current supply According to an aspect of the present invention, the system may be provided wherein the processor is installed within the motor.

According to an aspect of the present invention, the system may be provided wherein the processor is configured to operate the motor to provide one of constant air flow, constant torque or constant speed.

According to an aspect of the present invention, the system may be provided wherein the processor is configured to transmit the command signal to a plurality of motors. The command signal may control an operating point of each of the plurality of motors.

According to an aspect of the present invention, the electronic control module may be provided wherein one of the motors includes a power supply and may communicate with other motors on a distribution bus formed by the supply lines.

According to an aspect of the present invention, the system may be provided wherein the system is adapted for use in refrigeration cabinet and wherein the processor is configured such that the operating point of at least two of the plurality of motors are independently adjustable.

According to an aspect of the present invention, the system may be provided wherein the processor is configured such that the operating point of at least one of the plurality of motors is adjusted to compensate for an underperforming motor.

According to an aspect of the present invention, the system may be provided wherein the processor is configured such that the operating point of at least one of the plurality of motors is adjusted to balance the temperature of the cabinet.

According to an aspect of the present invention, the system may further include a light positioned within the cabinet. The processor may be configured such that the light is disabled in response to an operating point of at least one of the plurality of motors.

According to an aspect of the present invention, the system may be provided wherein the processor is located within one of the power supply and the motor.

According to an aspect of the present invention, the system may be provided wherein the processor is adapted to be programmed utilizing near field communications.

According to an aspect of the present invention, the system may be provided wherein the command signal further includes configuration parameters.

According to another embodiment of the invention, a method for controlling a motor is provided. The method includes the steps of providing first and second current supply lines, operably connecting the supply lines to the motor and to a power supply, and receiving an input at an electronic control module. The method further includes the steps of generating, using the electronic control module, a command signal in response to the input and transmitting the command signal over the first and second current supply lines to the motor coupled to the electronic control module. The method further includes the steps of determining, from the command signal, a corresponding operating point for the motor, transmitting power from the power supply over the first and second current supply lines to the motor, and operating the motor at the operating point.

According to another aspect of the present invention, the system may be provided wherein the electronic control module is at least partially located in the power supply.

According to another aspect of the present invention, the system may be provided wherein the electronic control module further includes an airflow algorithm.

According to another aspect of the present invention, the system may be provided wherein the airflow algorithm is adapted to monitor speed of the motor.

According to another aspect of the present invention, the system may be provided wherein the airflow algorithm is adapted to monitor torque of the motor.

According to another aspect of the present invention, the system may be provided wherein the airflow algorithm is adapted to monitor current draw to the motor.

According to another aspect of the present invention, the system may be provided wherein the airflow algorithm is adapted to provide constant air flow to the system.

According to another aspect of the present invention, the system may be provided wherein the airflow algorithm is adapted to detect clogged filters in a HVAC system.

According to another aspect of the present invention, the system may be provided wherein the airflow algorithm is adapted to detect clogged exhaust pipes in a ceiling fan system.

According to another aspect of the present invention, the system may be provided wherein the airflow algorithm is adapted to send signals to indicate air flow irregularities.

According to another aspect of the present invention, the system may be provided wherein the signals are provided by one of an LED light or a blinking light.

According to another aspect of the present invention, the system may be provided wherein the electronic control module further includes an algorithm to monitor system health.

According to another aspect of the present invention, the system may be provided wherein the algorithm to monitor system health includes an airflow algorithm.

According to another aspect of the present invention, the system may be provided wherein the algorithm to monitor system health includes monitoring for unstable variables.

According to another aspect of the present invention, the system may be provided wherein the algorithm to monitor system health includes monitoring for over current.

According to another aspect of the present invention, the system may be provided wherein the algorithm to monitor system health includes monitoring for over temperature.

DETAILED DESCRIPTION OF THE INVENTION

The method, systems and apparatus described herein facilitate the transmission of command signals to an electric machine.

The electric machine typically includes a housing for containing and supporting a stator that is excited by an electrical source that excites an electromagnetic field in coils in the stator. The coils interact with a rotor rotatably supported in the housing to provide the mechanical rotational energy for the electrical machine.

Electric machines or motors are utilized in many varied application and are energized utilizing a user interface. The motors may be positioned in locations not easily accessible to the user. Such applications include ceiling fans, HVAC applications and refrigeration applications. In order to provide convenient access to the user interface, such applications have a user interface spaced a significant distance from the motor.

To provide improved performance and energy savings multiple speed motors are frequently used. The user interface for such motors provides for command signals to be sent to the motor that include information in addition to a simple on and off. Such signals include the proper operating speed of the multiple speed motor. The wiring harnesses needed to transmit the command signals from the user interface to the motor are expensive to manufacture and inconvenient to install, particularly in existing structures.

Technical effects of the methods, systems, and apparatus described herein include at least one of reduced cost, improved serviceability, improved performance and quality and reduced labor costs.

Figure 1:
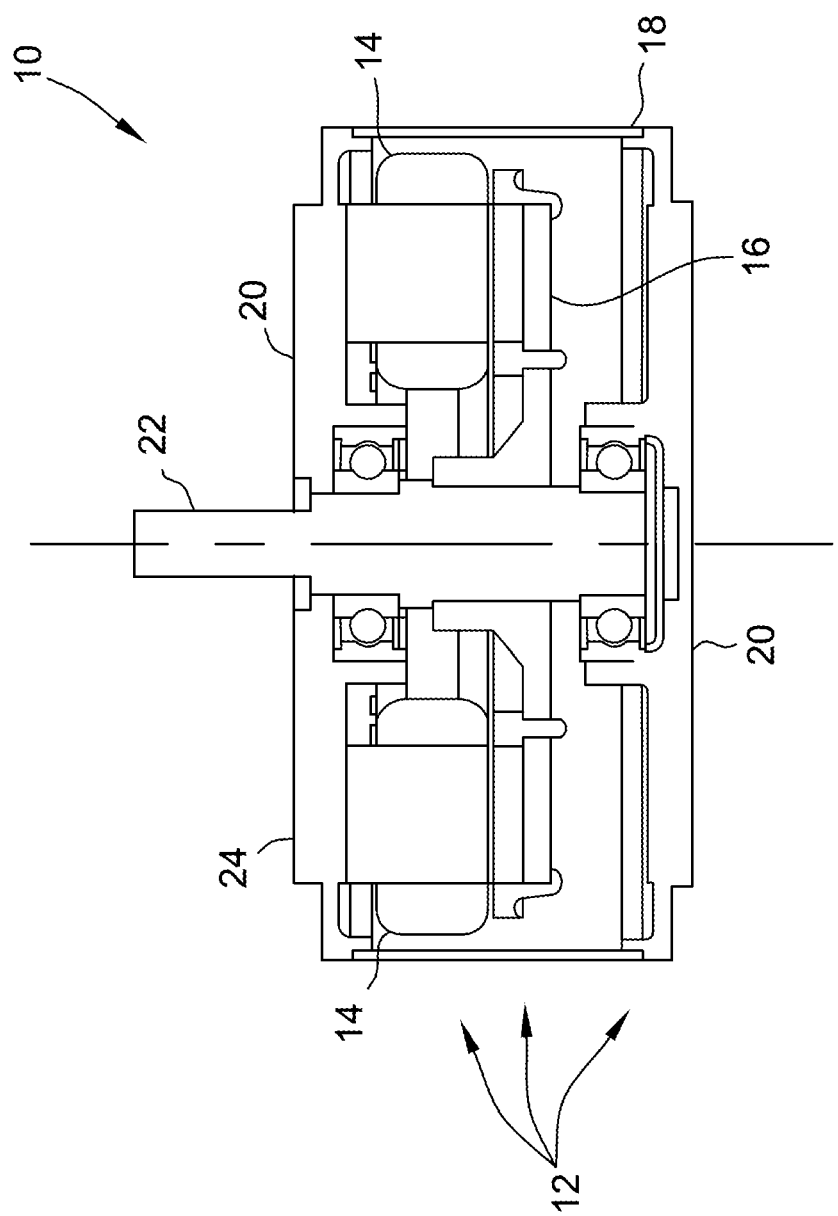
FIG. 1 is a cross sectional view of an electric machine for use with an electronic control module of the present invention.

According to an embodiment of the present invention and referring to FIG. 1, an electric machine 10 is provided. The electric machine 10 may be an electric motor or an electric generator, but hereinafter will be described as an electric motor 10. It should be appreciated that the electric motor may be used to power any mechanism, for example, ceiling fan, a HVAC (heating, ventilation, and air conditioning) application, a pump, a cyclic drive, a compressor, a vehicle, a fan or a blower.

The electric machine 10 includes a housing 12, a coil 14 operably connected to the housing 12 and a rotor 16. The rotor is rotatably secured to the housing 12 and defines a first end of the housing 12. The rotor extends outwardly from a first end of the housing 12.

The electric machine or motor 10 typically includes the rotor 16 that rotates relative to the motor 10. Electrical energy applied to typically a plurality of coils 14 within the motor 10. The coils 14 generate an electromagnetic field that cooperates with a magnetic field in rotor 16. The coils 14 initiate relative motion between the rotor 14 and the motor 12 that transfers the power from the coils to the rotor 14.

The housing 12 may include a plurality of components and may be made of a suitable durable material, for example a metal, a polymer or a composite. The housing 12 may, as shown, include a cylindrical shell 18 and opposed end caps 20. A shaft 22 may extend outwardly from a first end 24 of the electric motor 10, typically extending from one of the end caps 20. The motor 10 may have any suitable size and shape and may be, for example, an induction motor, a permanent-split capacitor (PSC) motor, an electronically commutated motor (ECM) motor, or a switched reluctance motor. Attempts to send signals to and from a power supply or a motor controller may create additional complexity and hardware and may be very expensive. Inexpensive and reliable transmissions of signals to and from a power supply or a motor controller is desirable in the design and manufacture of such electric machines. The method, systems and apparatus described herein facilitate transmissions of signals to and from a power supply or a motor controller of an electric machine. Designs and methods are provided herein to facilitate transmissions of signals to and from a power supply or a motor controller of an electric machine.

According to an embodiment of the present invention and referring to FIG. 1, an electric machine 10 is provided. The electric machine 10 may be an electric motor or an electric generator, but hereinafter will be described as an electric motor 10. It should be appreciated that the electric motor may be used to power any mechanism, for example, a pump, a cyclic drive, a compressor, a vehicle, a fan or a blower.

While as shown in FIG. 1, the electric motor 10 is an axial flux motor, a radial flux motor or any other motor configuration may be used with this invention.

Figure 2:
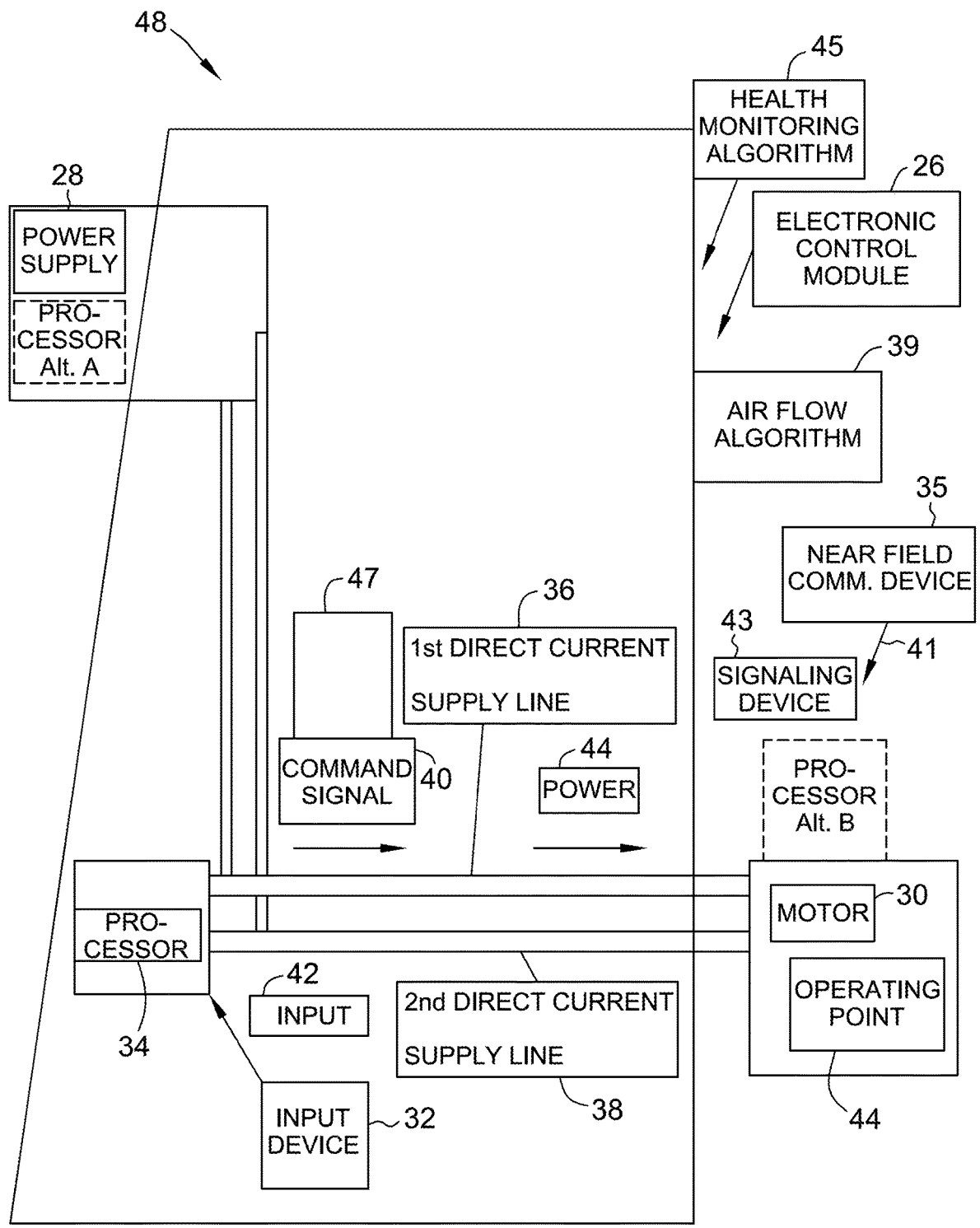
FIG. 2 is a block diagram of an electronic control according to an embodiment of the present invention installed in the electric machine of FIG. 1.

According to the present invention and referring now to FIG. 2, an electronic control module 26 is provided. The electronic control module 26 is operably connected to a power supply 28 for providing power to a motor 30. The motor 30 may be any motor and may, for example, be in the form of the motor 10 of FIG. 1.

As shown the motor 30 is an Electronically Commutated Motor (ECM) motor. ECM or EC motors are synchronous motors that are powered by a DC electric source via an integrated inverter/switching power supply, which produces an AC electric signal to drive the motor. In this context, AC, alternating current, does not imply a sinusoidal waveform, but rather a bi-directional current with no restriction on waveform. Additional sensors and electronics control the inverter output amplitude and waveform and therefore percent of DC bus usage/efficiency and frequency (i.e. rotor speed).

The rotor part of a brushless motor is often a permanent magnet synchronous motor as described as motor 12 of FIG. 1, but can also be a switched reluctance motor, or induction motor.

In the exemplary embodiment, power supply 28 supplies a single-phase alternating current (AC) voltage to processor 34. However, power supply 28 may supply three-phase AC, or any other type of input voltage that processor 34 and motor 30 to function as described herein. The power supply 28 may be a direct current power supply and may more specifically be a 24 Volt direct current supply. Alternately, the power supply 28 may be an alternating current (AC) power supply. If an alternate current power supply, the power supply may provide line voltage AC and low voltage AC.

The electronic control module 26 includes an input device 32; a processor 34 coupled to the input device 32 and first and second current supply lines 36 and 38, respectively.

The processor 34 is configured to generate a command signal 40 in response to an input 42 supplied by the input device 32 and transmit the command signal 40 to the motor 30. The command signal 40 controls an operating point 44 of the motor 30. The electronic control module 26 may be provided such that the processor 34 is adapted to be programmed utilizing near field communications. For example, the processor 34 may be adapted to communicate with a near field communication device 3 to configure the power supply 28. The command signal 40 may further include configuration parameters 47 for configuring the motor 30.

Further, the system 48 may be provided wherein the processor 34 is configured to operate the motor 30 to a constant air flow, constant torque or constant speed. The processor 34 may provide for the operator to select operating the system 48 with one of constant air flow, constant torque or constant speed.

The motor 30 may be any motor capable of having an operating point 44 of the motor controlled. For example, the motor 30 may be an electronically controller motor, for example an electronically controlled motor (ECM) provided by Regal Beloit Corporation, 200 State Street, Beloit, Wis. USA The first and second current supply lines 36 and 38, respectively, are operably connectable to the motor 30 and the processor 34.

At least one of the current supply lines 36 and 38, the input device 32 and the processor 34 are adapted to utilize the current supply lines 36 and 38 both to transmit power 46 to the motor 30 and to transmit the command signal 40 to the motor 30 over the current supply lines 36 and 38.

The input device 32 may be any device for providing operator input 42 to the electronic control module 26. For example, the input device 32 may be in the form of a user interface. For example, the user interface 32 may in the form of a keyboard for a desktop computer, a laptop computer, or a notebook computer. For example, the user interface 32 may be in the form of a smart phone. Alternately, the user interface may be a dedicated combination of keys, toggles, knobs and/or other devices. Alternatively, the user interface 32 may be a selector switch or a toggle switch.

The input device 32 may transmit the input 42 in the form of a signal over hard wires or wirelessly.

The processor 34 may, as shown in FIG. 2, be positioned within the electronic control module 26.

Alternatively, and as shown in FIG. 2, the processor may be in the form of processor 34A as shown by phantom lines. The processor 34A is positioned within power supply 28.

Alternatively, and as shown in FIG. 2, the processor may be in the form of processor 34B as shown by dashed lines. The processor 34B is positioned within motor 30.

It should be appreciated that the processor 34 may be alternatively positioned elsewhere within system 48.

In accordance to the invention and as shown in FIG. 2, the input 42 is sent by input device 32 to processor 34. The processor 34 sends command signal 40 by first current supply line 36 and by second current supply line 38 to motor 30 to control operating point 44 of the motor 30. The operating point 44 may be, for example, the speed, torque, current or voltage on the motor 30. The first current supply line 36 and the second current supply line 38 are also used to provide power 44 to the motor 30. The operating point 44 may, for example, include the speed of the motor. Alternatively, the operating point 44 may include the torque applied by the motor 30. Alternatively, the operating point 44 may include the current drawn by the motor 30.

The current supply lines 36 and 38 may be solid or stranded and may be made of an electrically conductive metal, such as aluminum or copper. Alternately, the lines 36 and 38 may be made of a composite material, such as carbon fiber.

The use of the current supply lines 36 and 38 to convey power 44 and the command signal 40 can be accomplished in several ways. For example, the power may be transmitted by direct current with a steady amplitude of current. Alternately, the power may be transmitted by alternate current. The command signal 40 may be sent by a pulse or sinusoidal current or voltage. The pulse or sinusoidal current of the command signal 40 may thus be superimposed over the power 44 on the same lines 36 and 38. Note that such superimposing of signals may be possible either when the power is transmitted by alternate current or by direct current.

The electronic control module 26 may be provided such that the command signal 40 operates at a frequency of one kilo hertz to one megahertz.

As shown in FIG. 2 and according to another aspect of the present invention, the system 48 may be provided wherein the electronic control module 26 further includes an airflow algorithm 39. The system 48 may be provided wherein the airflow algorithm 39 is adapted to monitor speed of the motor 30. Alternatively, the system 48 may be provided wherein the airflow algorithm 39 is adapted to monitor torque of the motor 30. Alternatively, the system 48 may be provided wherein the airflow algorithm 39 is adapted to monitor current draw to the motor 30. It should be appreciated that the system 48 may be provided wherein the airflow algorithm 39 is adapted to provide constant air flow to the system 48.

Further, the airflow algorithm 39 may be adapted to detect clogged filters in a HVAC system. Alternatively, the system 48 may be provided wherein the airflow algorithm 39 is adapted to detect clogged exhaust pipes in a ceiling fan system.

Alternatively, the system 48 may be provided wherein the airflow algorithm 39 is adapted to send signals 41 to indicate air flow irregularities. For example, the system 48 may be provided wherein the signals 41 may be provided by a signaling device 43, for example, an LED light or a blinking light. For example and as shown in FIG. 2, the system 48 may be provided wherein the airflow algorithm 39 is adapted to provide constant air flow to the system.

According to another aspect of the present invention and as shown in FIG. 2, the system 48 may be provided wherein the electronic control module further includes an algorithm 45 to monitor system health. For example, the system 48 may be provided wherein the algorithm 45 to monitor system health includes the airflow algorithm 39. For example, the system 48 may be provided wherein the algorithm 45 to monitor system health includes monitoring for unstable variables, monitoring for over current and/or monitoring for over temperature.

Figure 3:
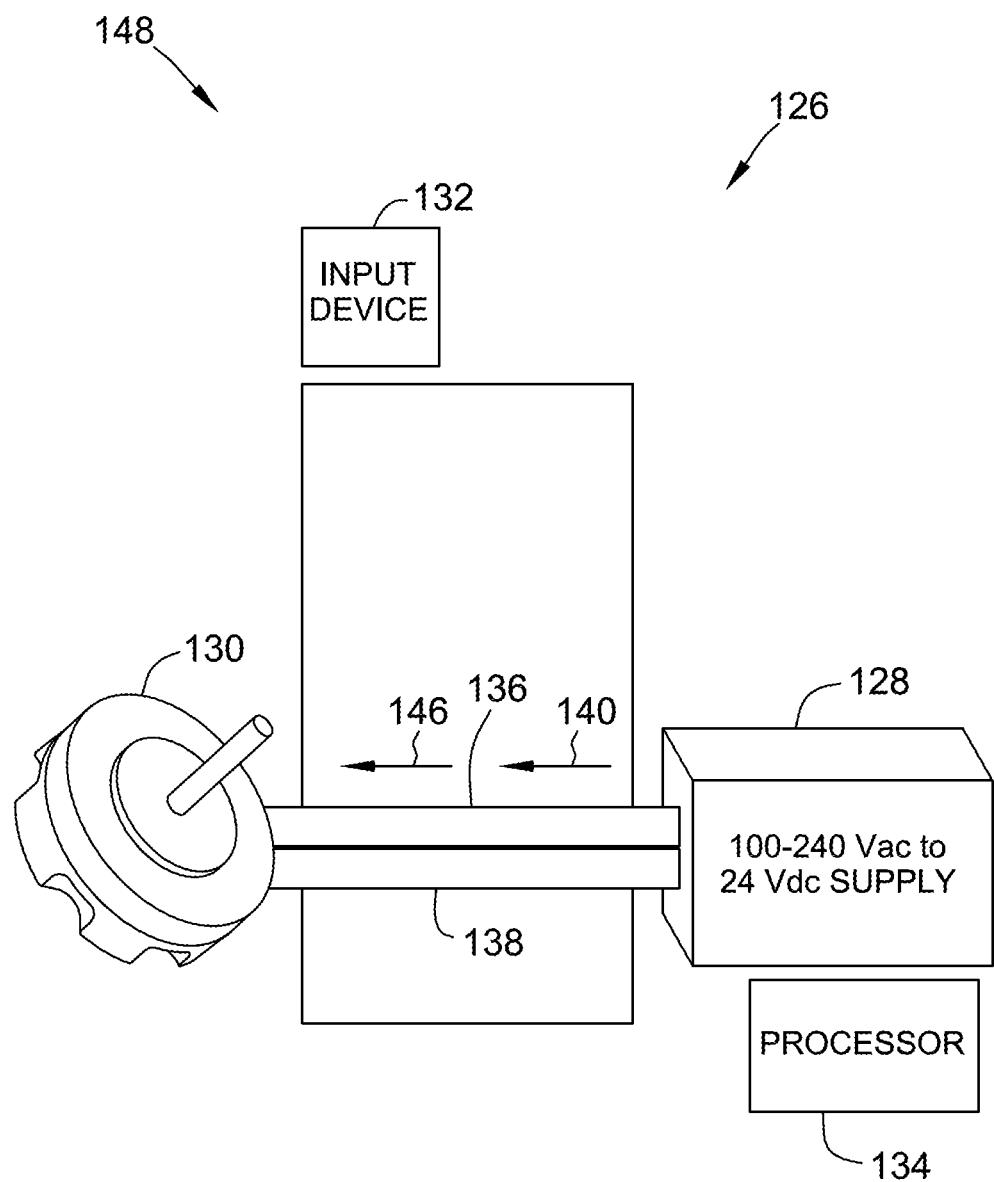
FIG. 3 is a block diagram of an electronic control according to another embodiment of the present invention showing alternate locations for the processor of the electronic control module.

According to an aspect of the present invention and referring now to FIG. 3, a system 148 may be provided. The system 148 includes an electronic control module 126. The electronic control module 126 includes an input device 132; a processor 134 coupled to the input device 132 and first and second current supply lines 136 and 138, respectively.

The module 126 is similar to module 26 of FIG. 2. The module 126 includes the processor 134 similar to processor 34 of module 26, except that the processor 134 is positioned in or adjacent to power supply 128. The power supply 128 is similar to power supply 28 of FIG. 2.

The first and second current supply lines 136 and 138 are similar to first and second current supply lines 36 and 38 of FIG. 2.

The input device 132 is similar to input device 32 of FIG. 2. Similar to system 48 of FIG. 2, the system 148 is configured to have the input device 132 send an input 142 to the processor 132. The processor 134 sends a command signal or a control signal 140 over supply lines 136 and 138 to motor 130. The power supply 128 sends power 146 over the supply lines 136 and 138 to motor 130. It should be appreciated that the command signal 140 may be changed depending on the needs of user of the system 148 and the command signal 140 may, over time, represent various different command signals 140.

In configuration such as those of the system 148 of FIG. 3 in which the processor 134 is located in the power supply 128, utilization of the supply lines 136 and 138 to transmit both the control signal 140 and the power 146 to the motor provides for a very simple and convenient configuration for the installation of the system 148 and saves in wiring material costs and in wiring installation costs.

The system 148 of FIG. 3 may further provide for response signals 174 from the electric motor 130 to the control module 126. Similar to the command signal 140, the response signals 174 may be carried over the first and second supply lines 136 and 138, respectively. The response signal 174 may provide information about the current and past conditions in the motor and may include information obtained from sensors (not shown) in the motor or from control circuitry (not shown) within the motor that may store information including prior signals sent to the motor or received from sensors in the motor.

Figure 4:
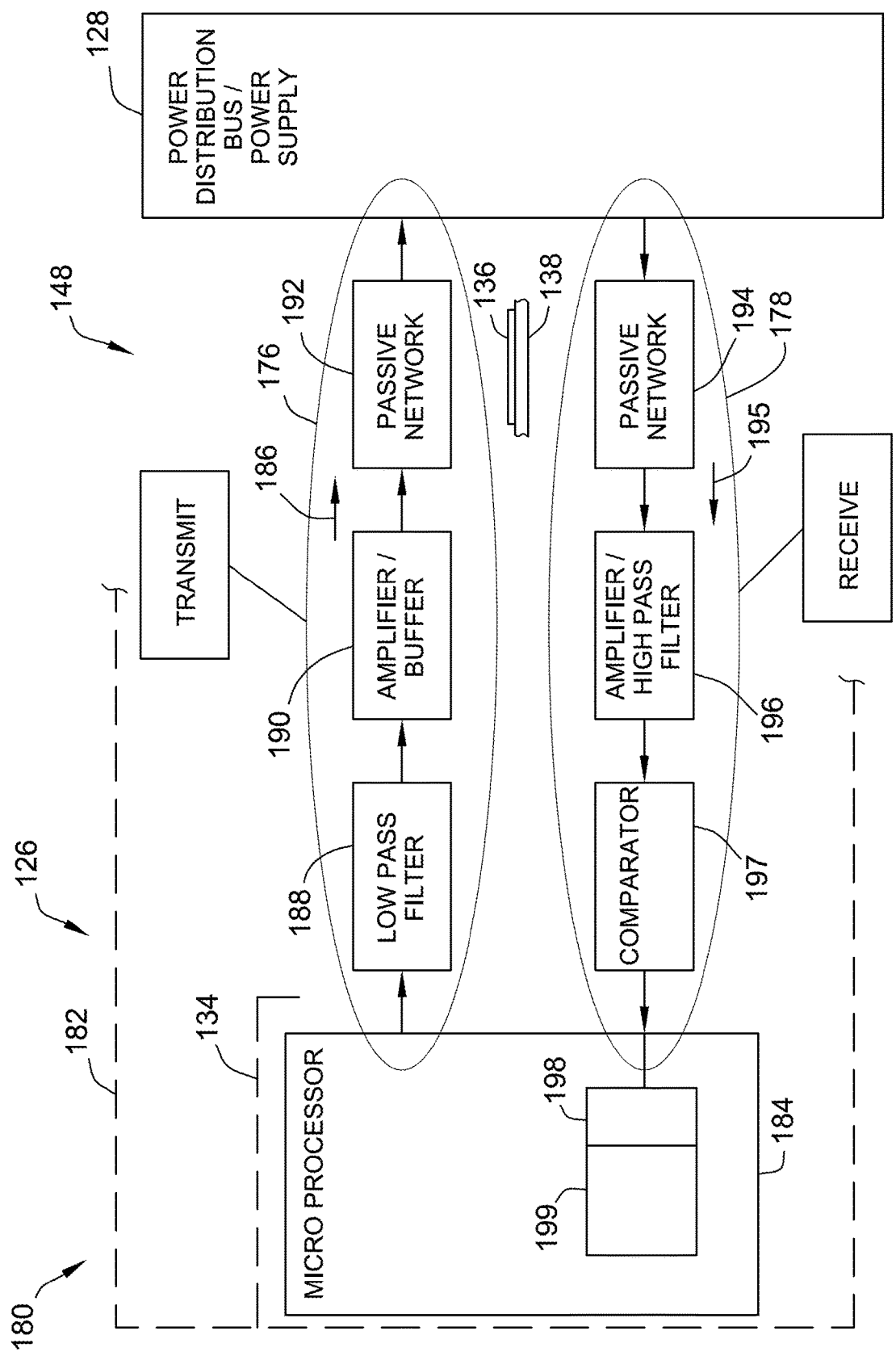
FIG. 4 is a block diagram of the electronic control of FIG. 3 showing the transmission of a command signal from a control module to the electric machine and the receiving of responses from the electric machine to the control module in greater detail.
Figure 5:
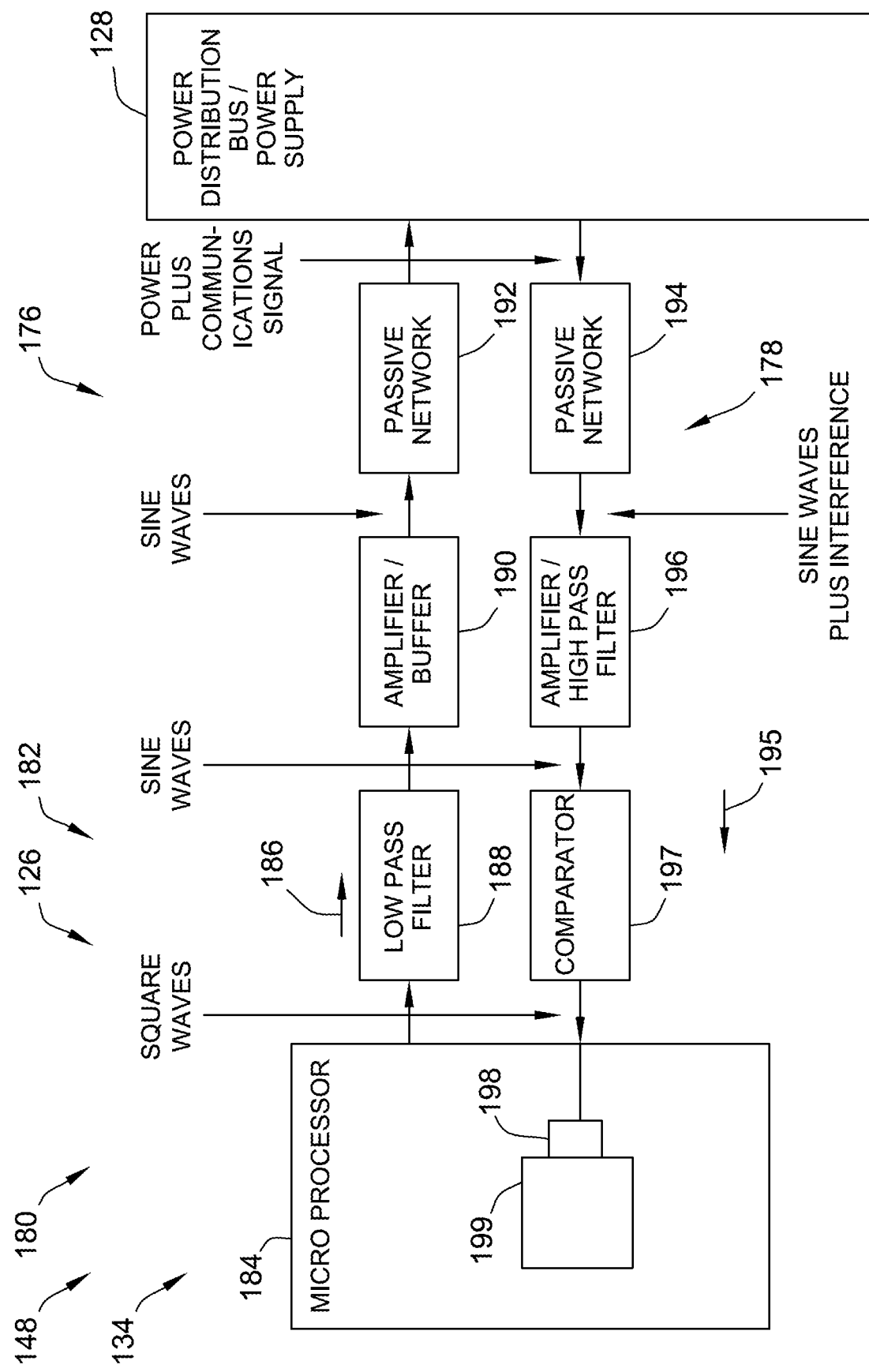
FIG. 5 is a block diagram of the electronic control of FIG. 3 showing the transmission of a command signal from a control module to the electric machine and the receiving of responses from the electric machine to the control module in greater detail.

While the response signals 174 and the command signals 140 may be separated from the power 146 sent to the motor 130 using any currently available technology, transmitting circuitry 176 and receiving circuitry 187, as shown in FIGS. 4 and 5, may be used.

As shown in FIGS. 4 and 5, the system 148 of FIG. 3 may include transmitting circuitry 176 and receiving circuitry 178. As shown in FIGS. 4 and 5, the transmitting circuitry 176 and the receiving circuitry 178 may be part of a system circuitry 180 located on a circuit board 182.

A single microcontroller or microprocessor (uProcessor or uP) 184 that may be a part of the processor 134 located, for example, in the control module 126, the power supply 128 or motor 130 will have the capability to transmit and receive data over the power distribution lines 136, 138 (DC or AC). The transmission process begins with the uProcessor 184 generating an asynchronous digital communication bit stream or signal 186 at a specific BAUD rate (e.g. 4800, 9600, 19200 . . . ). This signal 186 is then modulated to a higher frequency. For example, a zero state could be represented by 180 KHz and a one state by 220 KHZ. This represent Frequency Shift Keying—in addition other encoding mechanisms are well known. The modulated signal 186 is output on one of the uP pins as a square wave. A low cost transmission circuit 188 filters the square wave from the uP into a waveform similar to pure sine wave. Then an analog amplifier 190 increases the amplitude and driving power of the signal. Finally, a passive network 192 (capacitor or capacitor/inductor or transformer) couples the modulated signal on to the power distribution lines on top of the existing power transmission waveform.

The receiver portion or receiving circuitry 178 of the system circuitry 180 uses a passive network 194, similar to line coupling passive network 192 of the transmitting portion or transmitting circuitry 176 to pull modulated signal 195 off of the power transmission lines or power supply 128 while rejecting the power carrying signal 146. An analog amplifier 196 boosts the signal 195 while further filtering our high and low frequency noise from the power distribution system. The signal 195 is fed to a comparator 197 where the original square wave modulated signal 195 is reconstructed. This square wave is fed into an input capture pin 198 on the uP 184. Inside the uP 184, the frequency is detected and the original asynchronous bit stream is generated. The uprocessor 184 may then interpret the bit stream as typical with software or a standard UART hardware block 199.

According to an aspect of the present invention and referring now to FIG. 4, a system 248 may be provided. The system 248 may be configured for use in a bathroom 250. The system 248 includes a fan or blower 252 that may be mounted in ceiling 254. The fan or blower 252 is turned off and on with a user interface or input device 232 in the form of, for example, a wall switch mounted to wall 256 of bathroom 250. The fan 252 may be positioned in a fan housing or box 235.

The system 248 includes an electronic control module 226. The electronic control module 226 includes input device 232, a processor 234 coupled to the input device 232 and first and second current supply lines 236 and 238, respectively.

The module 226 is similar to module 126 of FIG. 3 in that the processor 134 is positioned in or adjacent to power supply 228. The power supply 228 is similar to power supply 28 of FIG. 2.

The first and second current supply lines 236 and 238 are similar to first and second current supply lines 36 and 38 of FIG. 2.

Similar to system 48 of FIG. 2, the system 248 is configured to have the input device 232 send an input 242 to the processor 232. The processor 234 sends a control signal 240 over supply lines 236 and 238 to motor 230. The power supply 228 sends power 246 over the supply lines 236 and 238 to motor 230.

In configurations such as those of the system 248 of FIG. 4 in which the processor 234 is located in the power supply 228, utilization of the supply lines 236 and 238 to transmit both the control signal 240 and the power 246 to the motor provides for a very simple and convenient configuration for the installation of the system 248 and saves in wiring material costs and in wiring installation costs. This simple and convenient configuration is useful for bathroom fan installations for new construction, as well as, for repairs and bathroom remodeling. The supply lines 236 and 238 can be located behind walls 256 or mounted exteriorly on the walls 256 using, for example, a conduit (not shown).

According to an aspect of the present invention and referring now to FIG. 5, a system 348 may be provided. The system 348, like the system 248 of FIG. 4, may be used in a bathroom 350. The system 348 includes a fan or blower 352 that may be mounted in ceiling 354. The fan 352 may be mounted in a fan box 353.

In fact and as is shown in FIG. 5, the system 348 may be entirely mounted in ceiling 354. The system 348 may include a cover or door 358 that may be secured, for example pivotally attached, to a system frame or housing 360 mounted in ceiling 354 and which holds or houses the components of the system 348. The system frame or housing 360 may be integral with fan box or housing 353.

The system 348 includes an electronic control module 326. The electronic control module 326 includes input device 332, a processor 334 coupled to the input device 332 and first and second current supply lines 336 and 338, respectively.

The fan or blower 352 is turned off and on with user interface or input device 332. The device 332 may be similar to the device 32 of the module 26 of FIG. 2.

For example, the user interface 332 may in the form of a keyboard for a desktop computer, a laptop computer, or a notebook computer. For example, the user interface 332 may in the form of a smart phone. Alternately, the user interface may be a dedicated combination of keys, toggles, knobs and/or other devices. As shown in FIG. 5, the user interface 332 may be a selector switch. For example, the selector switch 332 may be adapted to select the size of the room for which the system is used. Alternatively or in addition, the selector switch 332 may be adapted to select the number of air changes per day for the room for which the system is used.

The module 326 may be similar to module 226 of FIG. 4. The module 326 may include the processor 334 similar to processor 234 of module 226. The module 326 is similar to module 226 of FIG. 4 in that the processor 334 is positioned in or adjacent to power supply 328. The power supply 328 is similar to power supply 28 of FIG. 2.

The first and second current supply lines 336 and 338 are similar to first and second current supply lines 36 and 38 of FIG. 2.

Similar to system 48 of FIG. 2, the system 348 is configured to have the input device 332 send an input 342 to the processor 332. The processor 334 sends a control signal 340 over supply lines 336 and 338 to motor 330. The power supply 328 sends power 346 over the supply lines 336 and 338 to motor 230.

In configuration such as those of the system 348 of FIG. 5 in which the processor 334 is located in the power supply 328, utilization of the supply lines 336 and 338 to transmit both the control signal 340 and the power 346 to the motor provides for a very simple and convenient configuration for the installation of the system 348 and saves in wiring material costs and in wiring installation costs. This simple and convenient configuration is useful for bathroom fan installations for new construction, as well as, for repairs and bathroom remodeling. The supply lines 236 and 238 can be located within the frame 360 of the system 348 and be easily installed and accessed behind door 358.

The system 348 may also include a sensor 362. The sensor 362 may be used to sense any variable, condition or characteristic that may affect the optimum operation of the blower or fan 352. For example, the sensor 362 may be used to sense light, temperature, humidity or motion. The system may be provided wherein the system is adapted to send a sensor signal 364 generated by the sensor 362 to the processor 334. The sensor signal 364 may be the input 342 or may be an additional signal and may be transmitted to the processor 334 in any suitable manner, such as those manners described regarding the transmission of input 42.

It should be appreciated that the system 348 may be provided wherein the system 348 is adapted to adjust the operating point 344 in response to the sensor signal 364 generated by the sensor 362.

The system 348 may be provided wherein the system 348 is adapted to adjust an operating point 344 of the motor 340 in response to the sensor signal 364 generated by the sensor 362.

The sensor may be any sensor capable measuring any variable, condition or characteristic such as light, temperature, humidity or motion. For example, the sensor 362 may be a light sensor. The light sensor 362 may be adapted to determine when the room 350 is in use.

According to another aspect of the present invention and as shown in FIG. 5, the system 348 may be provided wherein the sensor 362 is an occupancy sensor. The occupancy sensor 362 may, for example, be in the form of a motion detector. The motion detector 362 may be in the form of a IR device.

According to another aspect of the present invention and as shown in FIG. 5, the system 348 may be provided wherein the processor 334 is adapted to adjust the operating speed of the motor 330 when the occupancy sensor 362 detects that the room 350 is occupied.

According to another aspect of the present invention and as shown in FIG. 5, the system 348 may be provided wherein the processor 334 is adapted to keep the motor 330 running after the occupant leaves the room 350.

According to another aspect of the present invention and as shown in FIG. 5, the system 348 may be provided wherein the processor 334 is adapted to change the speed of the motor 330 after the occupant leaves the room 350.

As shown in FIG. 5, the system 348 may further include a timer 364. For example, the timer 364 may cooperate with the processor 334 to limit runtime of the motor 330. Alternatively or in addition, the timer 364 may cooperate with the processor 334 to limit energy use of the motor 330. Alternatively or in addition, the timer 364 may cooperate with the processor 334 to operate the motor 330 to provide for a minimum number of daily air changes.

Figure 6:
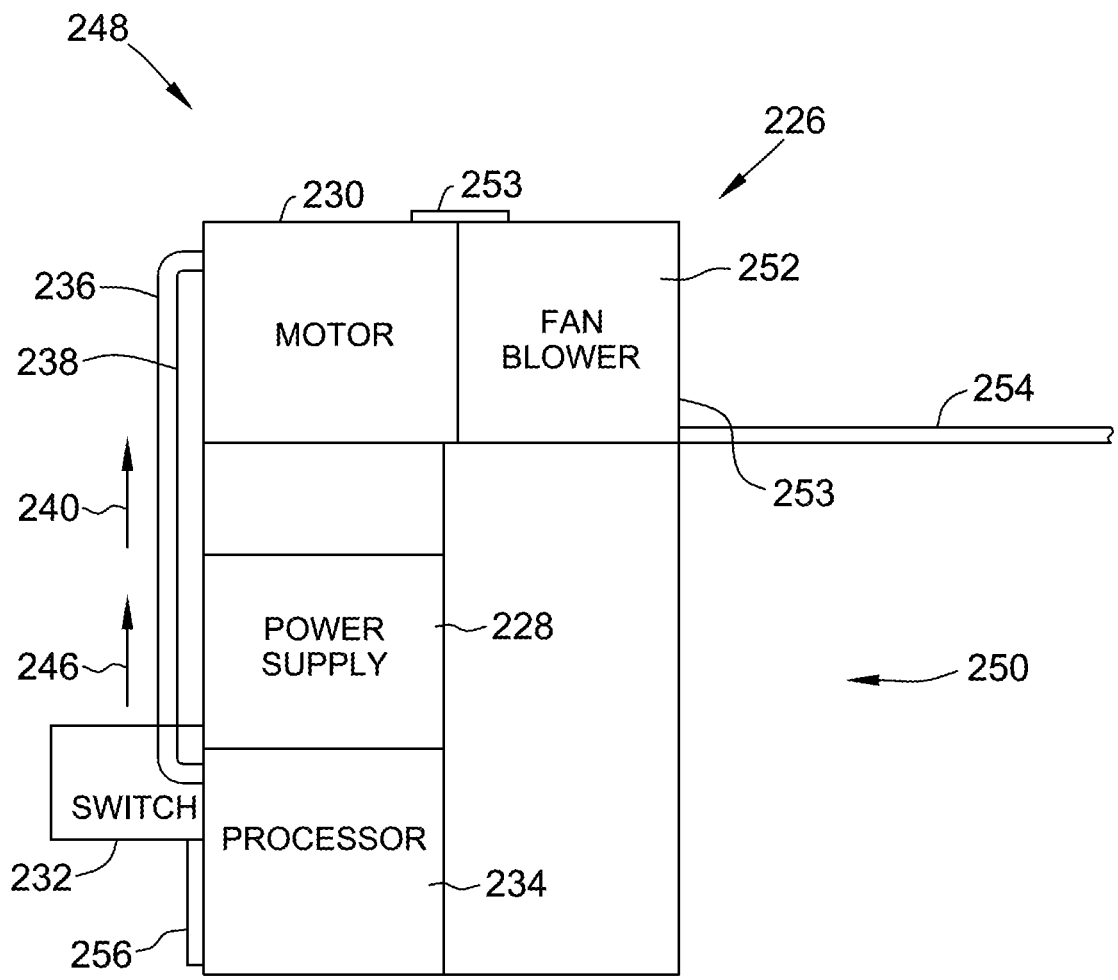
FIG. 6 is a plan view of a ceiling fan with a wall switch utilizing an embodiment of the electronic control module of the present invention.
Figure 7:
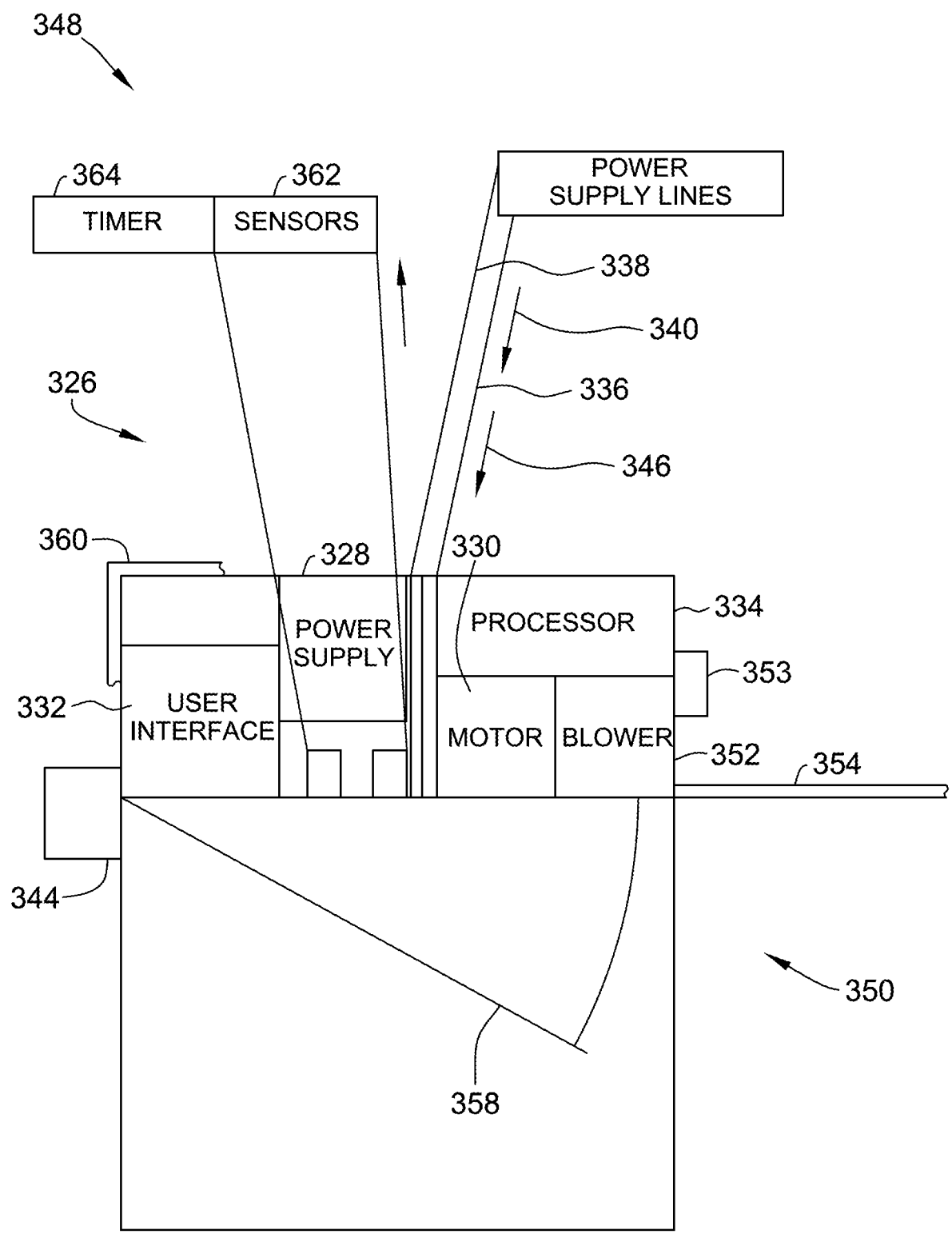
FIG. 7 is a plan view of a ceiling fan with a ceiling user interface utilizing an embodiment of the electronic control module of the present invention.
Figure 8:
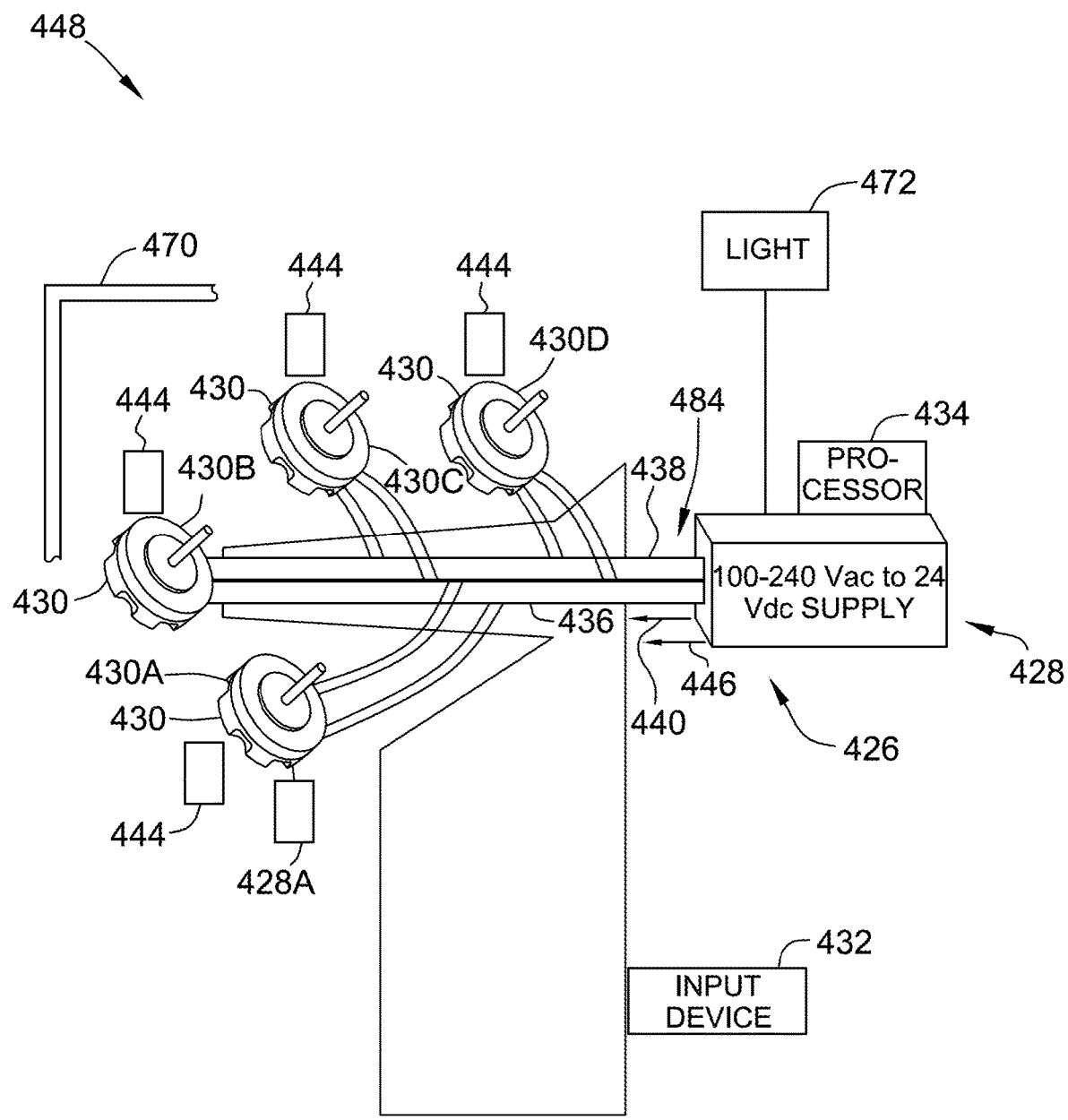
FIG. 8 is a plan view of a system including a plurality of motors utilizing the electronic control module of the present invention.
Figure 9:
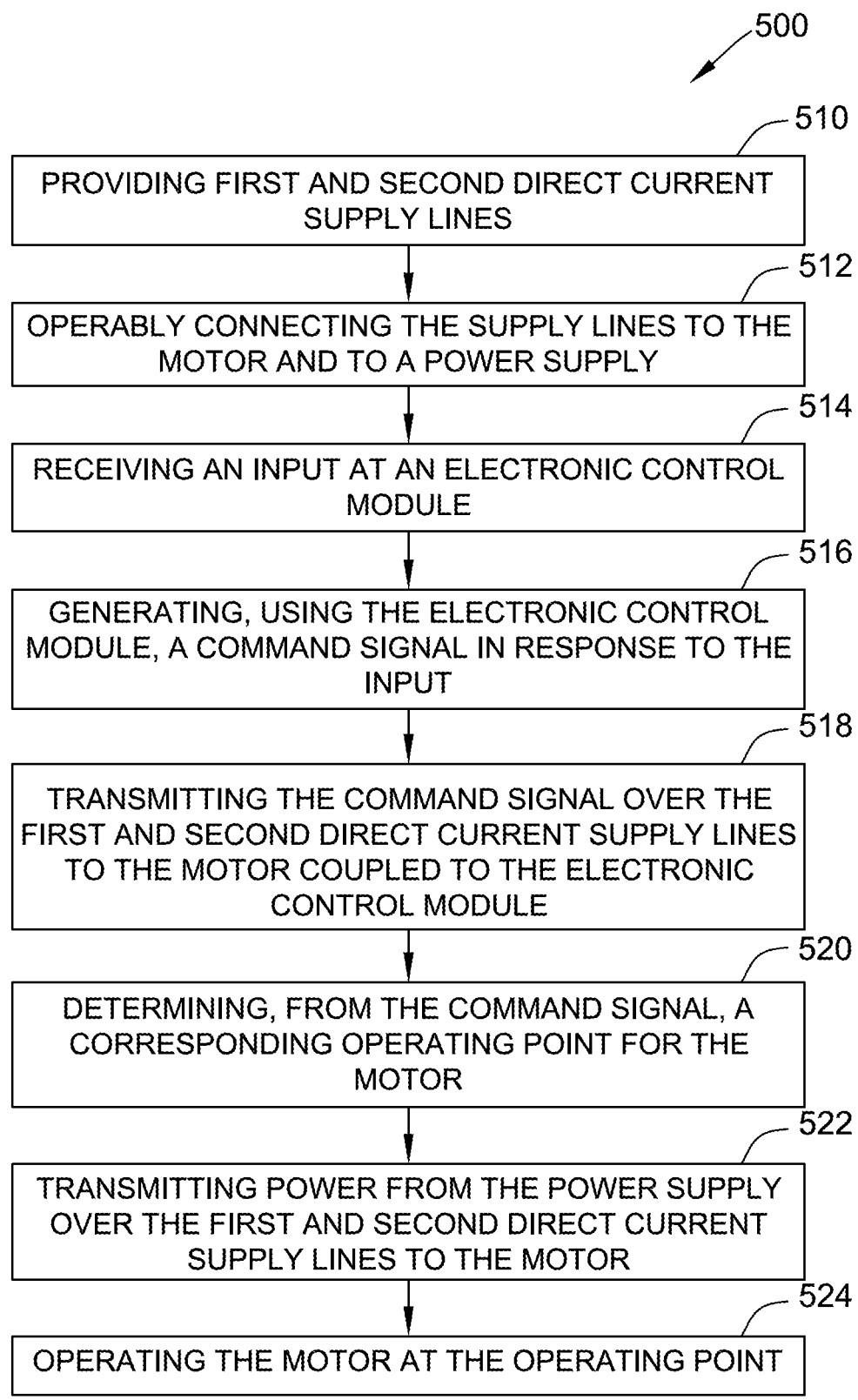
FIG. 9 is a flow chart of another embodiment of the present invention in the form of a method for providing a system for controlling an electric machine.

According to an aspect of the present invention and referring now to FIG. 6, an electronic control module 426 is shown for use in system 448. The system 448 includes the module 426 including a processor 434 configured to transmit a command signal 440 to a plurality of motors 430. The command signal 430 controls an operating point 444 of each of the plurality of motors 430. The processor 434 sends a control signal 440 over supply lines 436 and 438 to motors 430. The power supply 428 sends power 446 over the supply lines 436 and 438 to motor 430.

The system 448 may be adapted for use in refrigeration cabinet 470. The processor 434 may be configured such that the operating point 444 of at least two of the plurality of motors 430 is independently adjustable. Further, the processor 434 may be configured such that the operating point 444 of at least one of the plurality of motors 430 is adjusted to compensate for an underperforming motor. Further, the system 448 may be provided wherein the processor 434 is configured such that the operating point 444 of at least one of the plurality of motors 430 is adjusted to balance the temperature of the cabinet 470. Further, the system 448 may further include a light 472 positioned within the cabinet 470. The processor 434 may be configured such that the light 472 is disabled in response to an operating point 444 of at least one of the plurality of motors 430.

Continuing to refer to FIG. 6, one motor 430A of the motors 430 may include power supply 428A and may communicate with other motors 430B, 430C, and 430D on a distribution bus 484 formed by the supply lines 436 and 438.

According to another embodiment of the invention, a method 500 for controlling a motor is provided. The method 500 includes step 510 of providing first and second current supply lines, step 512 of operably connecting the supply lines to the motor and to a power supply, and step 514 of receiving an input at an electronic control module. The method further includes step 516 of generating, using the electronic control module, a command signal in response to the input and step 518 of transmitting the command signal over the first and second current supply lines to the motor coupled to the electronic control module. The method further includes step 520 of determining, from the command signal, a corresponding operating point for the motor, step 522 of transmitting power from the power supply over the first and second current supply lines to the motor, and step 524 of operating the motor at the operating point.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic control module operably connected to a power supply for providing power to a first motor, said electronic control module comprising:
    an input device;
    a processor coupled to said input device, said processor configured to:
        generate a command signal in response to an input supplied by said input device and according to an airflow algorithm stored at the electronic control module, the airflow algorithm adapted such that a constant fluid flow is provided by the first motor; and
        transmit the command signal to the first motor, wherein the command signal controls an operating point of the first motor; and
    first and second current supply lines connected to the first motor and said processor, at least one of said current supply lines, said input device, or said processor being adapted to utilize said current supply lines both to transmit power to the first motor and to transmit the command signal to the first motor, such that the command signal is superimposed over the power by coupling the command signal on to said current supply lines on top of an existing power transmission waveform, over said first and second current supply lines.

2. An electronic control module in accordance with claim 1:
    wherein said processor is configured to transmit the command signal to a plurality of motors, including the first motor; and
    wherein the command signal controls an operating point, separate from the operating point of the first motor, of each of the plurality of motors.

3. An electronic control module in accordance with claim 1, wherein said processor is located within one of the power supply or the first motor.

4. An electronic control module in accordance with claim 1, wherein said processor is adapted to be programmed utilizing near field communications.

5. An electronic control module in accordance with claim 1, wherein the command signal operates at a frequency in the range of one kilo hertz to one megahertz.

6. A motor control system comprising:
    a first motor;
    an input device;
    an electronic control module including a processor coupled to said input device, said processor configured to:
        generate a command signal in response to an input supplied by said input device and according to an airflow algorithm stored at the electronic control module, the airflow algorithm adapted such that a constant fluid flow is provided by the first motor; and
        transmit the command signal to the first motor, wherein the command signal controls an operating point of the first motor;
    a current supply; and
    first and second current supply lines connected to said first motor and said processor, at least one of said current supply lines, said input device, or said processor being adapted to utilize said current supply lines both to transmit power to said first motor and to transmit the command signal to said first motor, such that the command signal is superimposed over the power by coupling the command signal on to said current supply lines on top of an existing power transmission waveform, over said first and second current supply lines.

7. The system in accordance with claim 6:
    further comprising a fan box; and
    wherein at least one of said current supply or said first motor are housed in said fan box.

8. The system in accordance with claim 6:
    wherein said input device includes a light switch; and
    wherein said current supply is located adjacent said light switch.

9. The system in accordance with claim 6, wherein said current supply is a 24 Volt direct current power supply.

10. The system in accordance with claim 6, wherein said processor is installed within said first motor.

11. The system in accordance with claim 6, wherein said processor is configured to operate said first motor to provide one of constant air flow, constant torque, or constant speed.

12. The system in accordance with claim 11, wherein said processor is configured to transmit the command signal to a plurality of motors, including said first motor, wherein the command signal controls an operating point, separate from the operating point of the first motor, of each of the plurality of motors.

13. The system in accordance with claim 12:
    wherein the system is adapted for use in a refrigeration cabinet; and
    wherein said processor is configured such that the operating point of at least two of said plurality of motors are independently adjustable.

14. The system in accordance with claim 13, wherein said processor is configured such that the operating point of at least one of said plurality of motors is adjusted to compensate for underperformance by said at least one of said plurality of motors.

15. The system in accordance with claim 13, wherein said processor is configured such that the operating point of at least one of said plurality of motors is adjusted to balance a temperature of the cabinet.

16. The system in accordance with claim 13:
further comprising a light positioned within the cabinet; and
wherein said processor is configured such that said light is disabled in response to the operating point of at least one of said plurality of motors.

17. The system in accordance with claim 6, wherein said processor is located within one of said current supply and said first motor.

18. The system in accordance with claim 6, wherein said processor is adapted to be programmed utilizing near field communications.

19. The system in accordance with claim 6, wherein the command signal further includes configuration parameters.

20. A method for controlling a motor, said method comprising:
providing first and second current supply lines;
operably connecting the first and second current supply lines to the motor and to a power supply;
transmitting power from the power supply over the first and second current supply lines to the motor;
receiving an input at an electronic control module;
generating, using the electronic control module, a command signal in response to the input and according to an airflow algorithm stored at the electronic control module, the airflow algorithm adapted such that a constant fluid flow is provided by the motor;
transmitting the command signal over the first and second current supply lines to the motor coupled to the electronic control module such that the command signal is superimposed over the power by coupling the command signal on to said current supply lines on top of an existing power transmission waveform;
determining, from the command signal, a corresponding operating point for the motor; and
operating the motor at the operating point.

* * * * *